(12) United States Patent
Kordel et al.

(10) Patent No.: US 7,205,879 B2
(45) Date of Patent: Apr. 17, 2007

(54) CHISEL FOR A PYROMECHANICAL DISCONNECTING DEVICE

(75) Inventors: Gerhard Kordel, Nuremberg (DE); Jurgen Knauss, Obermichelbach (DE)

(73) Assignee: Delphi Technologies, Inc., Troy, MI (US)

( * ) Notice: Subject to any disclaimer, the term of this patent is extended or adjusted under 35 U.S.C. 154(b) by 344 days.

(21) Appl. No.: 10/876,457

(22) Filed: Jun. 28, 2004

(65) Prior Publication Data

US 2005/0073387 A1 Apr. 7, 2005

(30) Foreign Application Priority Data

Jun. 26, 2003 (DE) ............... 103 28 922
Apr. 6, 2004 (DE) ............ 10 2004 016 884

(51) Int. Cl.
*H01H 39/00* (2006.01)
*H01H 85/175* (2006.01)

(52) U.S. Cl. ............... 337/401; 337/157; 337/165

(58) Field of Classification Search ............... 337/157, 337/165, 401, 414, 417; 200/61.08
See application file for complete search history.

(56) References Cited

U.S. PATENT DOCUMENTS

| | | | | |
|---|---|---|---|---|
| 3,873,786 A | * | 3/1975 | Lagofun | 200/61.08 |
| 4,224,487 A | * | 9/1980 | Simonsen | 200/61.08 |
| 4,417,519 A | * | 11/1983 | Lutz | 102/263 |
| 5,535,842 A | * | 7/1996 | Richter et al. | 180/279 |
| 5,877,563 A | * | 3/1999 | Krappel et al. | 307/10.1 |
| 6,194,988 B1 | * | 2/2001 | Yamaguchi et al. | 337/157 |
| 6,232,568 B1 | * | 5/2001 | Hasegawa et al. | 200/61.08 |
| 6,556,119 B1 | * | 4/2003 | Lell | 337/157 |

FOREIGN PATENT DOCUMENTS

DE  19732650 A1 * 2/1999

* cited by examiner

*Primary Examiner*—Anatoly Vortman
(74) *Attorney, Agent, or Firm*—Jimmy L. Funke

(57) ABSTRACT

The invention relates to a pyromechanical disconnecting device having a housing (2) in which an electrical conductor (3) is arranged, having a cutting plunger (5) and a cutting chisel (8) made of plastic arranged thereon for severing the electrical conductor (3), and having a pyrotechnic igniter (1) in which a pyrotechnic charge is arranged for driving the cutting plunger (5), the cutting chisel (8) having an edge that slides along a mating edge of the housing (2) or of a component (4) of the housing (2) when the cutting plunger (5) or the cutting chisel (8) is driven and when the electrical conductor (3) is severed.

Figure 1:
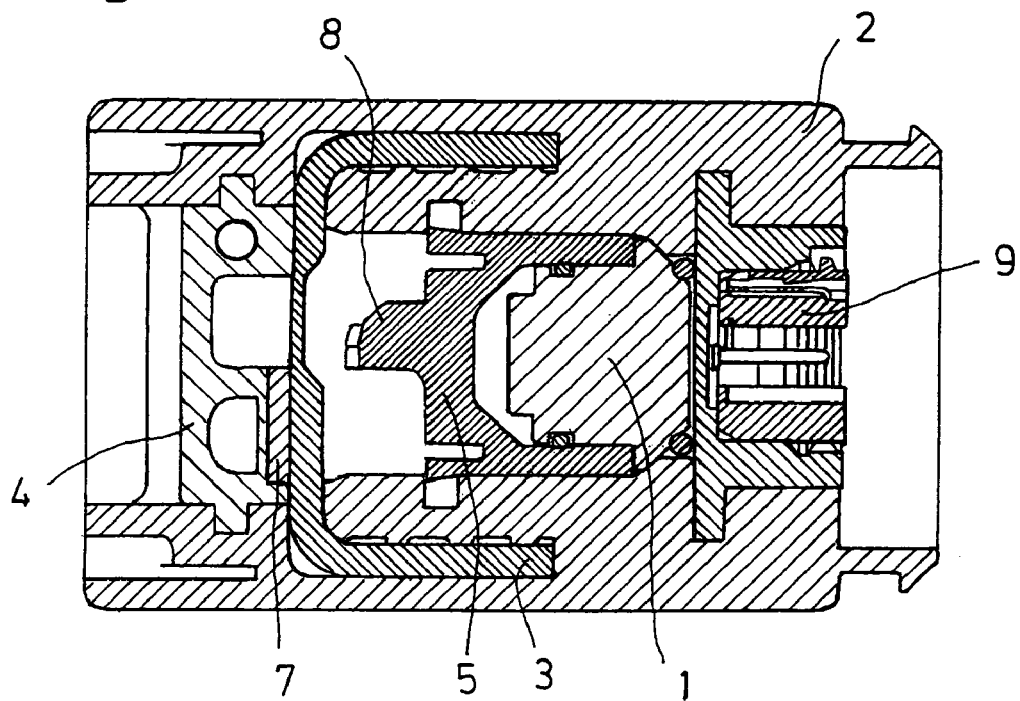

In order to achieve better cutting power, it is proposed that the edge of the cutting chisel (8) and/or the mating edge of the housing (2) or of a component (4) of the housing (2) comprise an inserted structural element (6, 7) having a greater hardness than plastic.

9 Claims, 3 Drawing Sheets

CHISEL FOR A PYROMECHANICAL DISCONNECTING DEVICE

FIELD OF THE INVENTION

This invention relates to a pyromechanical disconnecting device having a housing in which an electrical conductor is arranged and clamped therein by a lock component, having a cutting plunger and a cutting chisel made of plastic arranged thereon for severing the electrical conductor, and having a pyrotechnic igniter in which a pyrotechnic charge for driving the cutting plunger is arranged.

BACKGROUND

DE 197 32 650 A1 describes a pyromechanical disconnecting device having a housing in which an electrical conductor is arranged, having a cutting plunger and a cutting chisel made of plastic arranged thereon for severing the electrical conductor, and having a pyrotechnic igniter in which a pyrotechnic charge for driving the cutting plunger is arranged, the cutting chisel having an edge that slides along a mating edge of the housing or of a component of the housing when the cutting plunger or the cutting chisel is driven and when the electrical conductor is severed.

Disconnecting devices of the stated type can be used, for example, to interrupt the supply of current into the onboard network of a motor vehicle. These disconnecting devices are triggered in case of accident so that the supply of current is interrupted and the danger of fire is thereby diminished.

It is a drawback that the cutting power (severance of an electrical conductor with a given cross section) remains limited because of the strength properties of the cutting chisel made of plastic.

If a cutting chisel and the cutting edge are made as a unit, for example of ceramic, this has a negative impact on component costs.

BRIEF SUMMARY OF THE INVENTION

A goal of the invention is to improve a disconnecting device having a housing in which an electrical conductor is arranged and clamped therein by a lock component, having a cutting plunger and a cutting chisel made of plastic arranged thereon for severing the electrical conductor, and having a pyrotechnic igniter in which a pyrotechnic charge for driving the cutting plunger is arranged in such fashion that the cutting chisel has better cutting power, that is, can sever conductors larger in cross section, with no substantial increase in its manufacturing costs.

According to the invention this goal is achieved in that the edge of the cutting chisel and/or the mating edge of the housing or of a component of the housing comprises an inserted structural element having a greater hardness than plastic.

In a desirable embodiment, the structural element is made of steel or a ceramic, the structural element more expediently having sharp cutting edges.

The edge of the cutting chisel formed by the structural element is preferably made V-shaped, acutely tapered, or obliquely shaped in longitudinal section. The angle of the edge of the cutting chisel on the end face of the structural element advantageously lies between 180 degrees and 90 degrees. The aforesaid shapes of the edge have the advantage that the blade does not immediately impinge with its full width on the separating point of the electrical conductor to be cut but penetrates into the material beginning at two contact points or one contact point respectively. In the case of a V-shaped blade, the cutting force becomes progressively lower with decreasing spreading angle of the two arms of the V.

In a special preferred embodiment, the structural element has the shape of an inserted tip.

In one advantageous embodiment, the structural element of the cutting chisel reaches into the cutting plunger and there extends substantially perpendicularly to the edge. The structural element of the cutting chisel preferably has the shape of an angle or the shape of an L. These shapes of the structural element bring about a better pressure distribution from the edge to the base of the cutting chisel and thus to the cutting plunger when force is exerted on the cutting chisel by the cutting action, thus enlarging the bearing area so as to reduce the danger that the cutting chisel will be pushed through the cutting plunger.

The plunger with the cutting chisel and/or the housing or a component of the housing is preferably manufactured by plastic injection molding, and the structural element is laid into the injection mold at the time of plastic injection molding and is thus an integral constituent of the cutting chisel or of the housing or component of the housing.

DETAILED DESCRIPTION

In what follows, the invention will be explained in greater detail with reference to exemplary embodiments. FIG. 1 shows a pyrotechnic disconnecting apparatus for battery shutoff in a motor vehicle, having a pyrotechnic igniter 1 in which a pyrotechnics charge for driving a cutting plunger 5 is arranged. Igniter 1 is fired electrically, the electric feeds being affected via a connector 9 on housing 1. When igniter 1 is fired, the propellant gases formed by the pyrotechnics charge accelerate cutting plunger 5, on which a cutting chisel 8 is arranged, toward an electrical conductor 3, and cutting chisel 8 cuts conductor 3 at a separating point by virtue of its kinetic energy. Electrical conductor 3 is clamped in housing 2 by a component 4 (here also called a lock). A recess in arranged in component 4 in the region of the separating point. The edge of the recess forms a mating edge along which cutting chisel 8 slides when conductor 3 is severed.

Electrical conductor 3 is a current bus, current bus 3 having both its ends led out of housing 2 (not shown here). The electric cables or lines to be disconnected are hooked up to the two ends led out.

The severing of electrical conductor 3 thus takes place by a cutting operation that is initiated when cutting chisel 8 shrikes electrical conductor 3. The edge of lock component 4 (see FIG. 1) forms the requisite mating edge for the purpose of the cutting operation by cutting chisel 8, which performs the function of the "cutting die." In normal cutting tools this edge is sharp and has high strength, qualities that apply only conditionally because of the material properties of the lock 4 (plastic) and because of the manufacturing process (plastic injection molding).

Thus, according to the invention, the edge of cutting chisel 8 and/or the mating edge of housing 2 or of a component 4 of housing 2 comprises an inserted structural element 6, 7 having greater hardness than plastic. This is not shown in FIG. 1.

Figure 2:
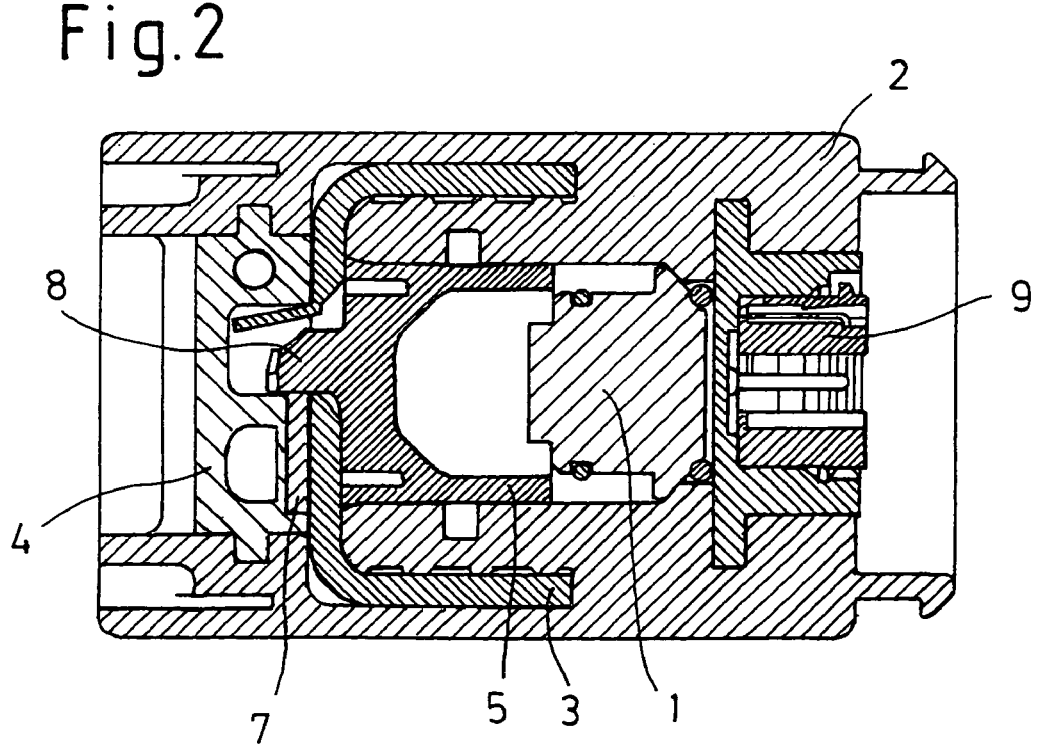

FIG. 2 shows the disconnecting device after igniter 1 has been fired and after electrical current conductor 3 has been severed. The propellant gases of the pyrotechnics charge of igniter 1 have accelerated cutting plunger 5 onto conductor 3, cutting chisel 8 arranged on cutting plunger 5 having severed electrical conductor 3 at the separating point.

Figure 3:
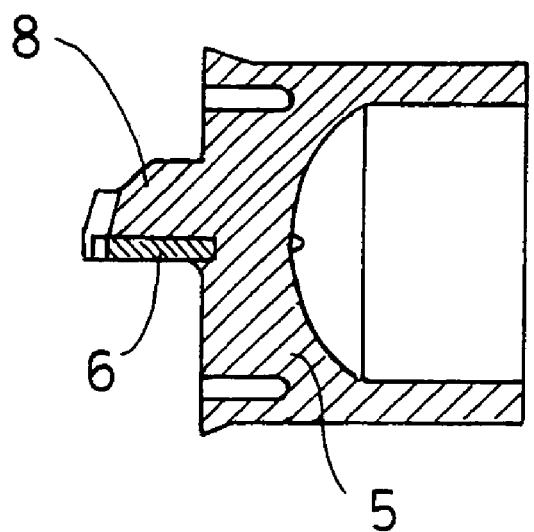

FIG. 3 shows cutting plunger 5 with a cutting chisel 8 according to FIGS. 1 and 2. Cutting chisel 8 is depicted equipped with an additional structural element 6 according to the invention as an insert in the form of a steel or ceramic tip, which forms the actual cutting knife for severing current conductor 3. The shape of the blade must be adapted to the material to be severed. It is made either V-shaped, acutely tapered, or obliquely shaped. The cited shapes have the advantage that the blade does not immediately impinge with its full width on the separating point of electrical conductor 3 to be cut but penetrates into the material beginning at two contact points or one contact point respectively. In the case of a V-shaped blade, the cutting force becomes progressively lower with decreasing spreading angle of the two arms of the V.

Figure 4:
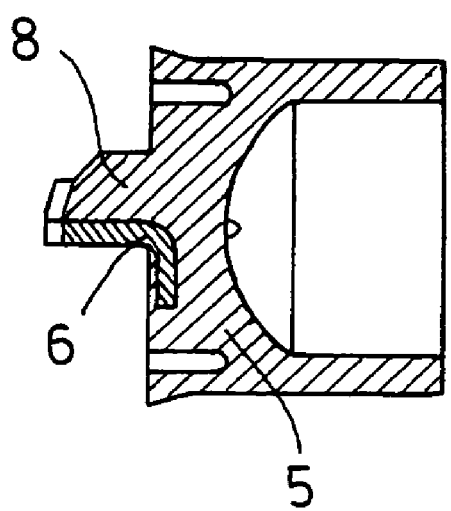

FIG. 4 shows a further advantageous shape of structural element 6 as a cutting knife insert in cutting chisel 8. Here structural element 6 in the form of an insert is made of ceramic in the shape of an angle or in the shape of an L. This shape brings about a better pressure distribution at the base of cutting chisel 8 when force is exerted by the cutting operation, thus enlarging the bearing area so as to reduce the danger that the cutting chisel will be pushed through the cutting plunger.

Figure 5A:
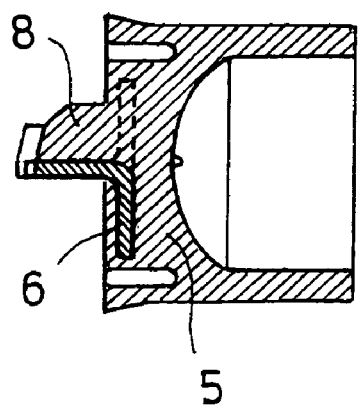
Figure 5B:
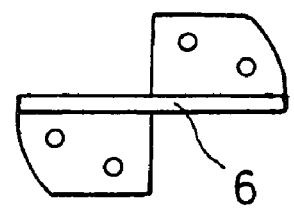

FIG. 5a and FIG. 5b show the fashioning of structural element 6 as a knife insert in cutting chisel 8 in the shape of a bent steel part. Here again the shaping of the knife insert at the base, by virtue of the relatively large bearing area, brings about a relatively low areal pressure on the bearing area of cutting chisel 8 and thus reduces the danger of its being pushed through because of force exerted by the cutting operation.

Structural elements 6 in their function as knife inserts in cutting chisel 8 are treated as inserts in the manufacturing process of cutting chisel 8 (plastic injection molding), being laid into the injection mold of cutting chisel 8, and after the injection molding operation they are an integral constituent of cutting chisel 8.

Figure 6:
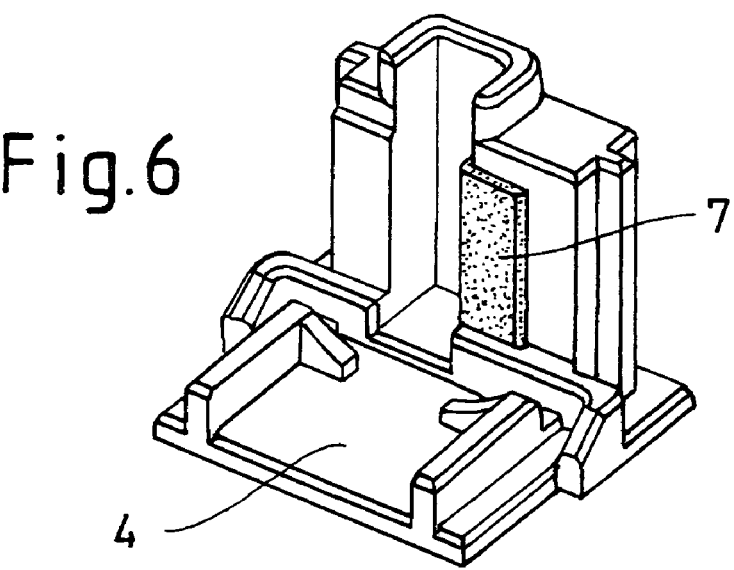

FIG. 6 shows a component 4 or lock having a steel or ceramic insert 7, for example in the shape of an inserted tip, which makes possible significantly improved cutting behavior possible because good cutting behavior is brought about by hardness and also the edge on the basis of the material properties and the manufacturing technology.

This laid-in steel or ceramic insert 7 is furthermore depicted in FIG. 2.

The invention claimed is:

1. Pyromechanical disconnecting device having a housing in which an electrical conductor is arranged and clamped therein by a lock component, having a cutting plunger and a cutting chisel made of plastic arranged thereon for severing the electrical conductor, having a pyrotechnics igniter in which a pyrotechnics charge for driving the cutting plunger is arranged, the cutting chisel having an edge that slides along a mating edge of the lock component when the electrical conductor is severed, and having an inserted structural element having a greater hardness than plastic coupled to the edge of the cutting chisel and/or the mating edge of the lock component.

2. Disconnecting device according to claim 1, wherein the inserted structural element is made of steel or a ceramic.

3. Disconnecting device according to claim 1, wherein the inserted structural element has sharp cutting edges.

4. Disconnecting device according to claim 1, wherein the inserted structural element has the shape of an inserted tip.

5. Disconnecting device according to claim 1, wherein the cutting plunger with the cutting chisel and/or the lock component is manufactured by plastic injection molding, and the inserted structural element is laid into the injection mold at the time of injection molding and is thus an integral constituent of the cutting chisel or of the lock component.

6. Pyromechanical disconnecting device having a housing in which an electrical conductor is arranged and clamped therein by a lock component, having a cutting plunger and a cutting chisel made of plastic arranged thereon for severing the electrical conductor, having a pyrotechnics igniter in which a pyrotechnics charge for driving the cutting plunger is arranged, the cutting chisel having an edge that slides along a mating edge of the lock component when the electrical conductor is severed, and having an inserted structural element having a greater hardness than plastic coupled to the edge of the cutting chisel and/or the mating edge of the lock component, and wherein the edge of the cutting chisel formed by the structural element is made V-shaped, acutely tapered, or obliquely shaped in longitudinal section.

7. Disconnecting device according to claim 6, wherein an angle of the edge of the inserted structural element of the cutting chisel on an end face is between 180 degrees and 90 degrees.

8. Pyromechanical disconnecting device having a housing in which an electrical conductor is arranged and clamped therein by a lock component, having a cutting plunger and a cutting chisel made of plastic arranged thereon for severing the electrical conductor, having a pyrotechnics igniter in which a pyrotechnics charge for driving the cutting plunger is arranged, the cutting chisel having an edge that slides along a mating edge of the lock component when the electrical conductor is severed, and having an inserted structural element having a greater hardness than plastic coupled to the edge of the cutting chisel and/or the mating edge of the lock component, and wherein the structural element of the cutting chisel reaches into the cutting plunger and there extends substantially perpendicularly to the edge.

9. Disconnecting device according to claim 8, wherein the inserted structural element of the cutting chisel has the shape of an angle or the shape of an L.

* * * * *